United States Patent
Tan et al.

(10) Patent No.: US 9,947,645 B2
(45) Date of Patent: Apr. 17, 2018

(54) MULTI-PROJECT WAFER WITH IP PROTECTION BY RETICLE MASK PATTERN MODIFICATION

(71) Applicants: GLOBALFOUNDRIES Singapore Pte. Ltd., Singapore (SG); International Business Machines Corporation, New York, NY (US); Renesas Electronics Corporation, Kawasaki-shi (JP)

(72) Inventors: Soon Yoeng Tan, Singapore (SG); Teck Jung Tang, Beacon, NY (US); Ian D. Melville, Highland, NY (US); Yelei Vianna Yao, Singapore (SG); Yasushi Yamagata, Hopewell Junction, NY (US)

(73) Assignees: INTERNATIONAL BUSINESS MACHINES CORPORATION, New York, NY (US); GLOBALFOUNDRIES SINGAPORE PTE. LTD., Singapore (SG); ENESAS ELECTRONICS CORPORATION, Kawasaki (JP)

( * ) Notice: Subject to any disclaimer, the term of this patent is extended or adjusted under 35 U.S.C. 154(b) by 194 days.

(21) Appl. No.: 14/751,170

(22) Filed: Jun. 26, 2015

(65) Prior Publication Data

US 2015/0294964 A1    Oct. 15, 2015

Related U.S. Application Data

(62) Division of application No. 13/161,514, filed on Jun. 16, 2011, now Pat. No. 9,069,923.

(51) Int. Cl.
    *G06F 17/50* (2006.01)
    *H01L 27/02* (2006.01)
    *H01L 21/66* (2006.01)

(52) U.S. Cl.
    CPC ...... *H01L 27/0207* (2013.01); *G06F 17/5068* (2013.01); *H01L 22/32* (2013.01); *G06F 2217/66* (2013.01)

(58) Field of Classification Search
    CPC ... H01L 21/263; H01L 21/283; H01L 21/304; H01L 21/78; H01L 21/76802; H01L 22/26; H01L 22/32; H01L 23/57; H01L 23/573; H01L 23/576; H01L 23/544; H01L 24/81; H01L 24/85; H01L 24/89; H01L 25/50; H01L 27/0207; H01L 27/02; H01L 29/06; H01L 29/66; G06F 2217/66; G06F 17/50; G06F 17/5068; G06F 7/06; G03F 1/50
    USPC .......... 257/48, 618, 499, E29.005, E23.179, 257/E27.001, E21.499, E21.334, E21.328, 257/E21.532, E21.53, E21.214, E21.211;
    (Continued)

(56) References Cited

U.S. PATENT DOCUMENTS

2007/0174638 A1    7/2007  Fan et al.
2007/0264798 A1*   11/2007 Tseng .................... B23K 26/14
                                                          438/460
2008/0296571 A1    12/2008 Cheng et al.
(Continued)

*Primary Examiner* — Marc Armand
*Assistant Examiner* — Younes Boulghassoul
(74) *Attorney, Agent, or Firm* — Horizon Pte Ltd.

(57) ABSTRACT

Multi-Project Wafers includes a plurality of chiplets from different IP owners. Non-relevant chiplets are implemented with IP protection to inhibit IP disclosure of non-relevant IP owners.

20 Claims, 25 Drawing Sheets

(58) Field of Classification Search
USPC ..... 438/14, 16, 17, 400, 127, 460, 107, 795, 438/689, 514, 758; 716/50, 55, 100
See application file for complete search history.

(56) References Cited

U.S. PATENT DOCUMENTS

| | | |
|---|---|---|
| 2009/0321870 A1 | 12/2009 | Chen et al. |
| 2010/0068832 A1* | 3/2010 | Shih .................... G03F 7/70425 438/16 |
| 2012/0088329 A1* | 4/2012 | Ken .......................... G03F 1/50 438/107 |

* cited by examiner

1400

MULTI-PROJECT WAFER WITH IP PROTECTION BY RETICLE MASK PATTERN MODIFICATION

CROSS-REFERENCE TO RELATED APPLICATION

This application is a divisional application which claims benefit of copending U.S. patent application Ser. No. 13/161,514, filed on Jun. 16, 2011, which is herein incorporated by reference in its entirety for all purposes.

BACKGROUND

Miniaturization of portable consumer products such as MP3 players, mobile phones, and digital camera is driving the need for smaller devices such as integrated circuits (IC) with high memory density and more functionality. As the size of the device becomes smaller, this however leads to higher production cost.

To reduce the fabrication cost, Multi-Projects-Wafer (MPW) is proposed as it offers the solution to integrate onto wafers a number of different designs modules which may also include intellectual property (IP) resources from various vendors or parties. Nevertheless, there could be risks where intellectual property (IP) resources from the various parties are exposed to third parties including competitors.

From the foregoing discussion, it is desirable to produce devices with low production cost and sufficient IP protection. It is also desirable to ensure IP protection during the delivery of the devices.

SUMMARY OF THE INVENTION

A method of forming a device is disclosed. The method includes providing a MPW mask having a plurality of chiplets pertaining to a plurality of IP owners. Non-relevant chiplet or chiplets of an IP owner are implemented with IP protection. A substrate is patterned using the MPW mask to form a device. The method further includes delivering the device to a relevant IP owner. The device includes the non-relevant chiplets of the IP owner, wherein IP protection reduces disclosure of IP information of the non-relevant chiplets to the relevant IP owner.

These and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

The fabrication of devices, such as integrated circuits (ICs), involves the formation of features on a substrate that make up circuit components, such as transistors, resistors and capacitors. The devices are interconnected, enabling the device to perform the desired functions. Interconnections are formed by forming contacts and conductive lines in a dielectric layer using, for example, damascene techniques. The features and interconnections are formed by repeatedly depositing and patterning layers on the wafer. The devices may have multiple interconnection layers. The structures of the different layers of the device are created or patterned using respective mask and etch techniques.

The various features and interconnections are strategically placed on the device to minimize the use of space and/or optimize performance. The placement of various features and interconnections is referred to as a product or device layout. The layers which form the components are in the lower levels while the interconnections are in the upper levels of the device layout. The interconnections may be provided in a plurality of interconnect levels.

Figure 1A:
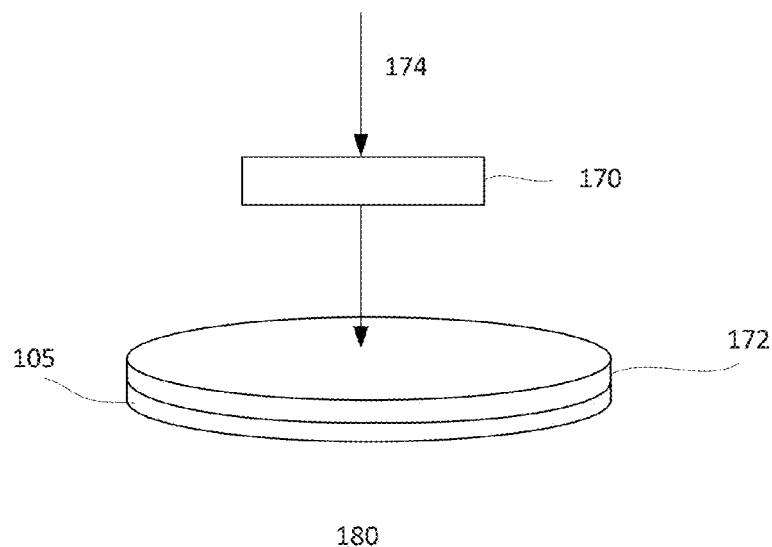
FIG. 1a shows a simplified diagram of a portion of an exemplary lithographic system and FIG. 1b shows a cross-sectional view of upper levels of a device.

To pattern the substrate, including a layer or layers on the substrate, a reticle 170 is used. The reticle contains the desired pattern which is to be transferred to a softmask 172, such as a photoresist, on the substrate 105. To transfer the pattern of the reticle to the softmask, a lithographic system 180 is used, exposing the softmask with an exposure source 174 through the reticle, as shown in FIG. 1a. After exposure, the softmask is developed to transfer the pattern on the reticle to the softmask. To improve lithographic resolution, an anti-reflective coating (ARC) may be employed below the soft mask.

Different masks or reticles are employed to form different layers or features of the device. For example, an active mask may be used to form the active regions of the device. The active mask, for example, may be referred to as an "RX" mask. Other masks may be used to form the different components, such as transistors, including p and n-type transistors. Multiple masks may be used to form multiple metal interconnect levels. An interconnect level may include contact plugs and metal lines formed in a dielectric layer, such as an interlevel dielectric (ILD) layer. Separate masks may be provided for the via and metal line levels. The trench and vias may be formed using, for example, dual damascene techniques. Other techniques for forming vias and trenches may also be useful. The interconnects may be formed from a conductive material, such as copper, tungsten, aluminium or alloy or a combination thereof. Other types of conductive materials may also be used to form the interconnect levels. It is understood that the via and conductive line levels may be formed of the same or different materials.

In one embodiment, a pad interconnect level is provided as a top or final interconnect level of the device. The pad level is related to forming bond pad connections. The pad interconnect level includes a via pad level and a pad level. The via pad level may be referred to as the "VV" level while the pad level may be referred to as the "LB" level. A VV mask and a LB mask may be provided corresponding to the VV and LB levels. The VV and LB levels may be aluminium levels. In other embodiments, the VV and LB levels may be other types of metal levels, such as copper or copper-alloy. Other types of metals may be used for the VV and LB levels. Providing VV and LB levels of different materials may also be useful. A passivation layer, such as polyimide, is provided over the LB level. The passivation layer may also include other types of materials. The passivation layer may be referred to as the "PV" level. A PV mask may be provided corresponding to the PV level. For example, if a wire bonding process is employed, the PV level may be referred to as the "DV" level. On the other hand, if a flip chip process such as a Controlled Collapse Chip Connection (C4) is adopted, the PV level may be referred to as the "LV" level. It is understood that other designations may be employed to refer to the different levels.

The passivation layer is patterned to form openings for forming external electrical connections. For example, the openings may be for wire bonds or contact bumps in the case of flip chip applications.

Figure 1B:
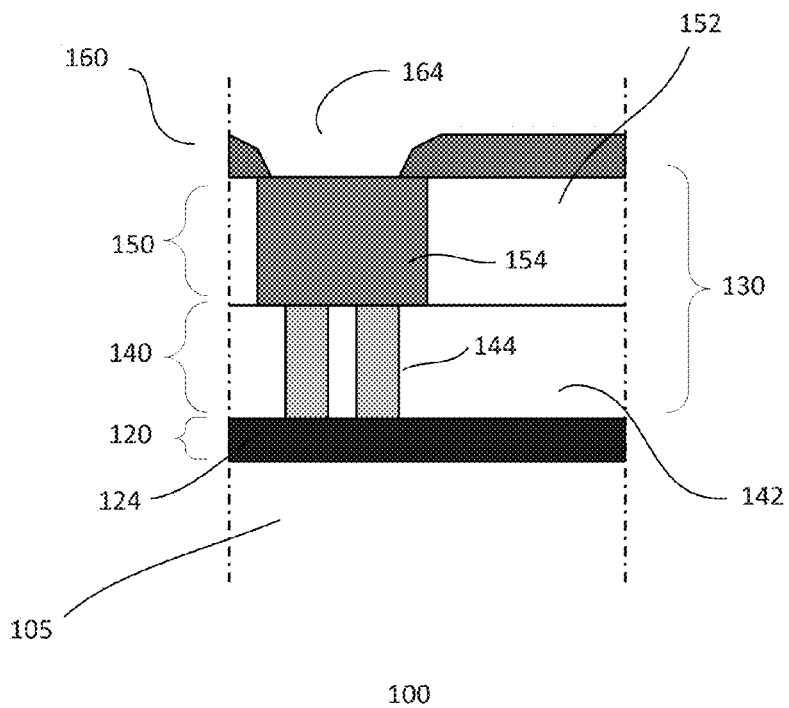

FIG. 1b shows a cross section of a portion of a device 100. As shown, the device is formed on a substrate 105. The device includes a pad interconnect level 130. The pad interconnect level includes a pad level 150 disposed above a pad via level 140. Below the pad via level is a last metal interconnect level 120. The last metal interconnect level may be referred to as Mx level, where X is the high number in a device. The pad level includes one or more conductive pads 154 formed in a pad dielectric layer 152. The conductive pads are coupled to pad vias 144 in a pad via dielectric layer 142 therebelow. The pad vias may provide interconnections between the conductive lines 124 in the last metal level and conductive pads. A passivation layer 160 is disposed over the pad interconnect level. The passivation layer includes openings 164 to expose the conductive pads.

The device may include other device levels (not shown) to form components and other interconnects of the device. For example, the device may include components such as transistors, capacitors, and interconnect levels to provide the desired function.

A first party, such as a designer of devices or design houses, may provide a second party, such as device manufacturers or foundries, with information related to the device. A device designer, for example, may be referred to as an "IP provider". The information is used to produce a set of masks or reticles used to manufacture a desired device.

In one embodiment, the masks used to form a device are multi-project wafer (MPW) masks which include multiple devices. For example, the mask set used to form a device is a MPW mask set used to form more than one type of device on a wafer.

Figure 2A:
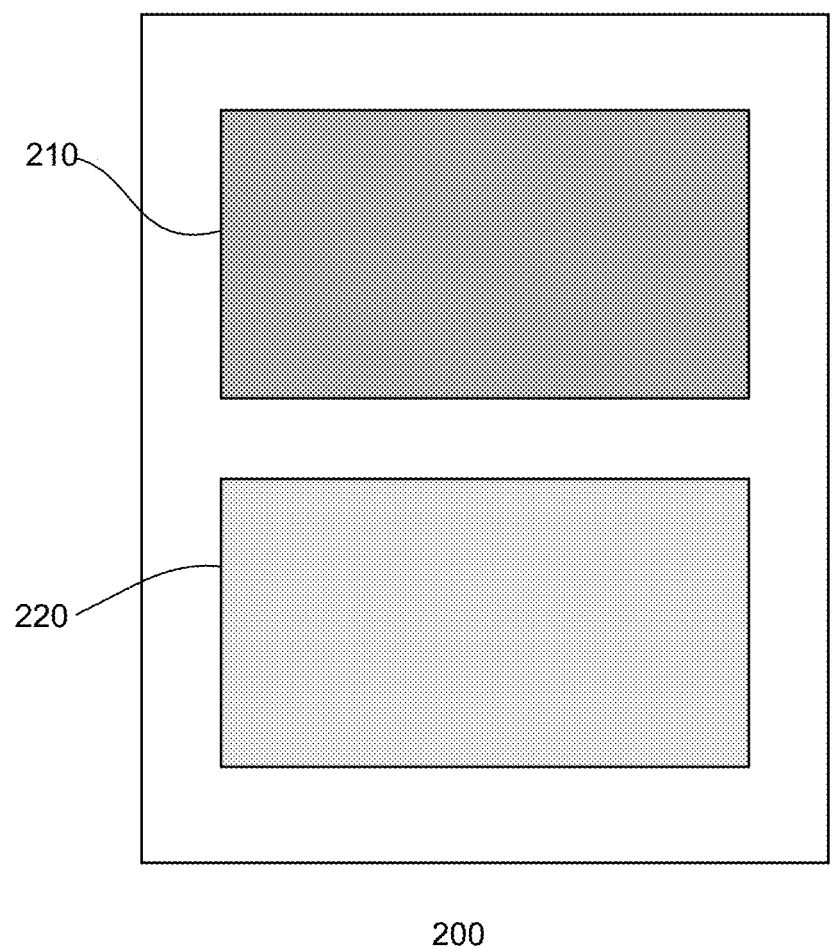
FIGS. 2a-b show different MPW masks.
Figure 2B:
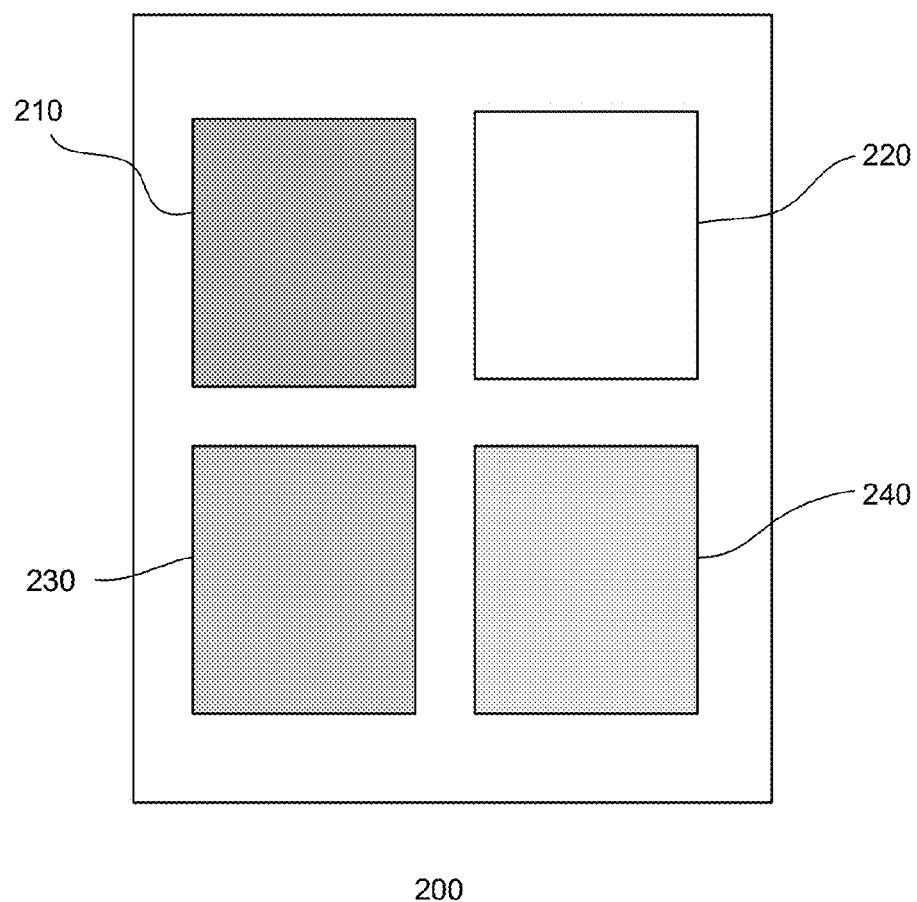

FIGS. 2a-b show embodiments of MPW masks 200. Referring to FIG. 2a, the MPW mask is configured to form first and second devices or chiplets 210 and 220. In FIG. 2b, the MPW mask is configured to form first, second, third and fourth chiplets 210, 220, 230 and 240. Providing MPW masks which form other number of chiplets may also be useful. In one embodiment, the MPW mask may be for 2n number of chiplets, where n≥1. In other embodiments, other number of chiplets >1 may be formed on the MPW masks, including odd numbers. In one embodiment, the chiplets on the MPW masks are from at least 2 or more IP providers.

Figure 3A:
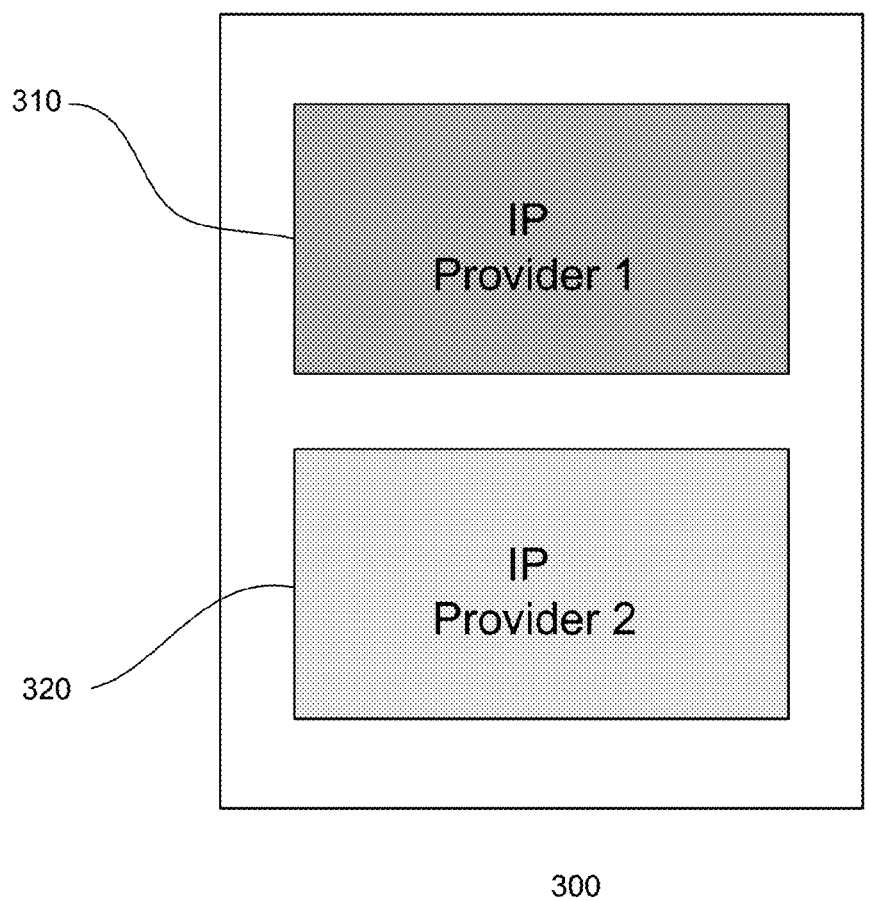
FIGS. 3a-b show other embodiments of MPW masks.
Figure 3B:
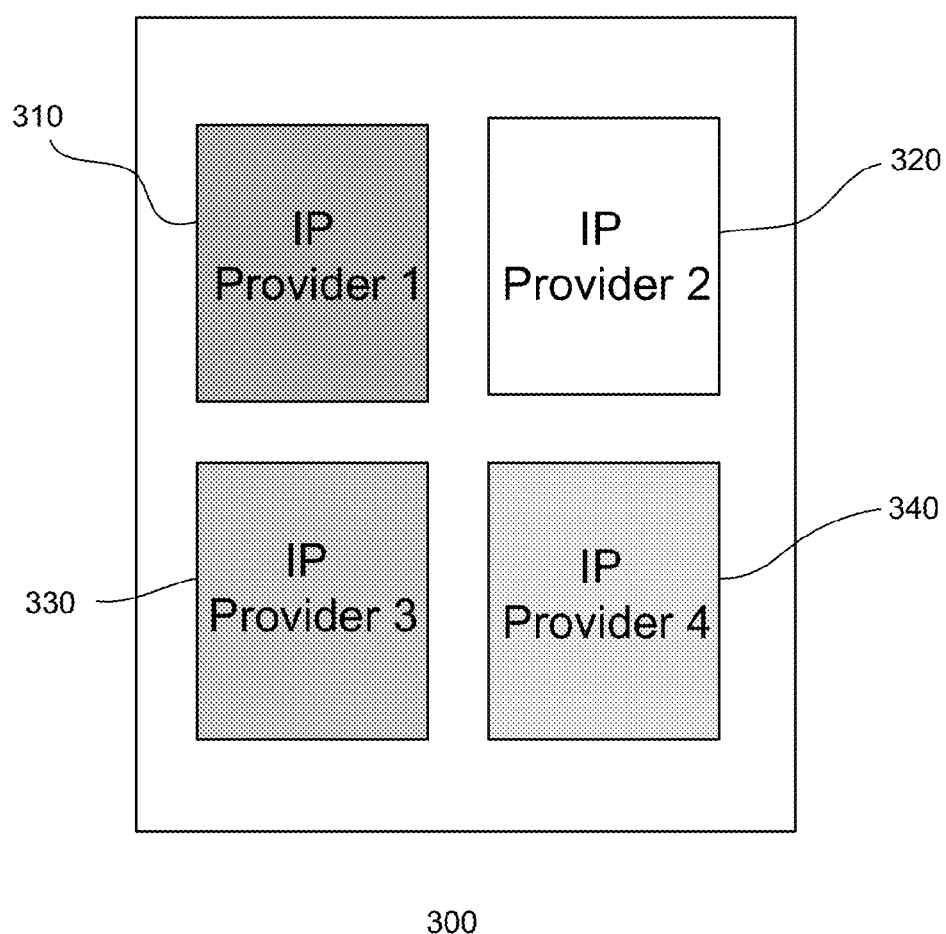

FIGS. 3a-b show embodiments of MPW masks 300 which includes chiplets from different first parties. For example, FIG. 3a shows a first chiplet 310 from a first IP provider and a second chiplet 320 from a second IP provider. FIG. 3b, for example shows a first chiplet 310 from a first IP provider, a second chiplet 320 from a second IP provider, a third chiplet 330 from a third IP provider and a fourth chiplet from a fourth IP provider. It is understood that a MPW mask has at least two first parties. For example, in the case where the MPW masks have more than 2 chiplets, some chiplets may be from the same first party. The masks are used to form devices on a wafer which includes all the chiplets.

Figure 4A:
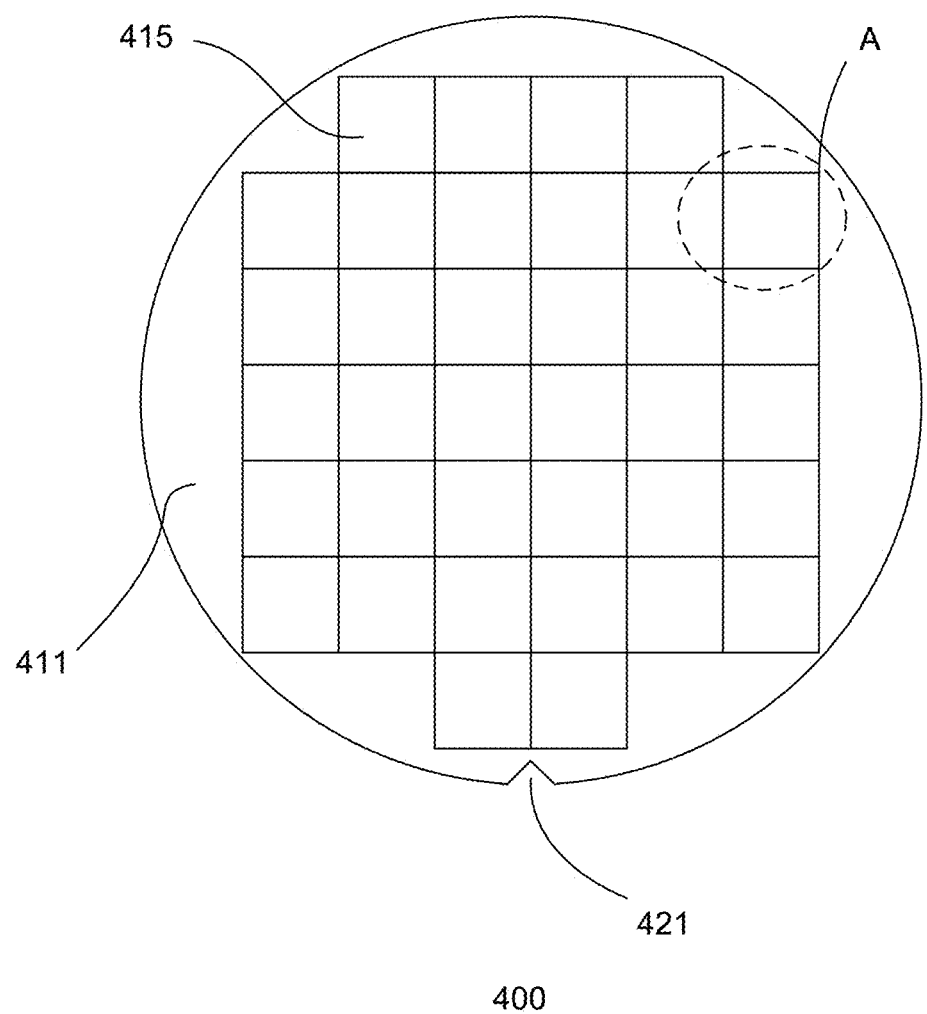
FIGS. 4a-b show a wafer and device formed by a MPW mask set.

FIG. 4a shows a semiconductor wafer 400 containing devices formed from a MPW mask set. The semiconductor wafer, for example, comprises a silicon wafer. Other types of wafers are also useful. For example, the wafer may be a p-type, n-type, silicon-on-insulator or silicon germanium wafer. Depending on the type of device, the wafer may comprise a non-semiconductor material. The wafer may include a notch 421 to indicate the crystal orientation of the wafer. Other techniques for indicating the crystal orientation may also be useful. Additional indicators may also be included to indicate the dopant type of the wafer.

The wafer includes an active surface 411 on which devices 415 are formed. A plurality of devices may be formed on the wafer in parallel. The devices, for example, are arranged in rows along a first (x) direction and columns along a second (y) direction. The devices are subsequently singulated into individual dies, assembled and tested.

Figure 4B:
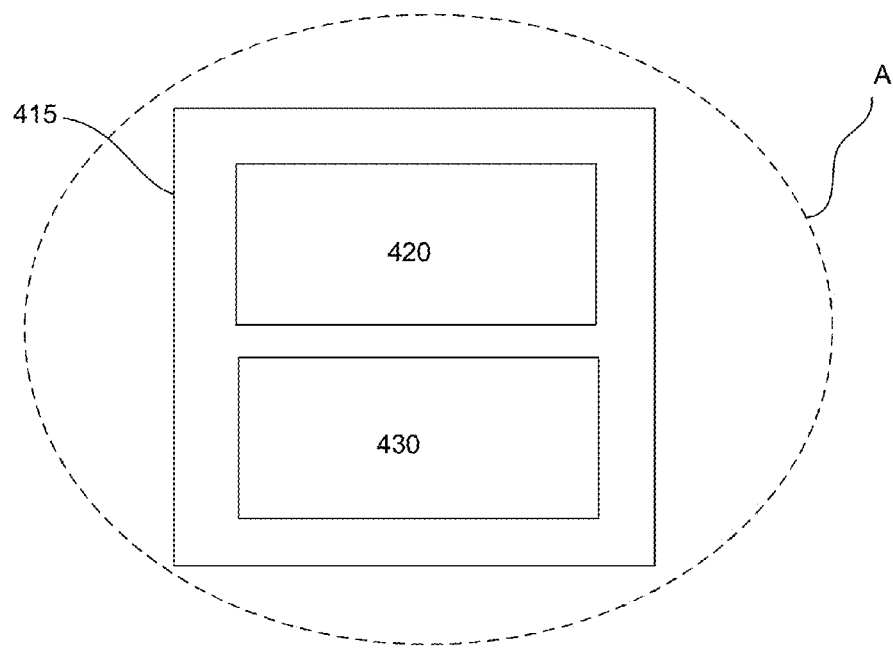

FIG. 4b shows a device 415 on the wafer in greater detail. As shown, the device formed by the MPW mask set includes first and second chiplets 420 and 430 from respective first parties or two IP providers. Wafers which may be processed by a second party, such as a foundry, are delivered to respective first parties. The wafers sent to both first parties contain the same devices or information. For example, the wafers sent to both parties contain chiplets of both parties. As such, the IP of one party may be accessed by the other party. For example, the IP of both parties may be accessed by either party.

In one embodiment, chiplets on a device which are not related to a party are IP protected to prevent disclosure of IP to non-relevant parties. The use of IP protection ensures that only the IP owner or a relevant party may access the IP of the chiplet. IP protection may include modifying the chiplets of non-relevant parties. For example, non-relevant chiplets are modified to obscure their IP.

Figure 5A:
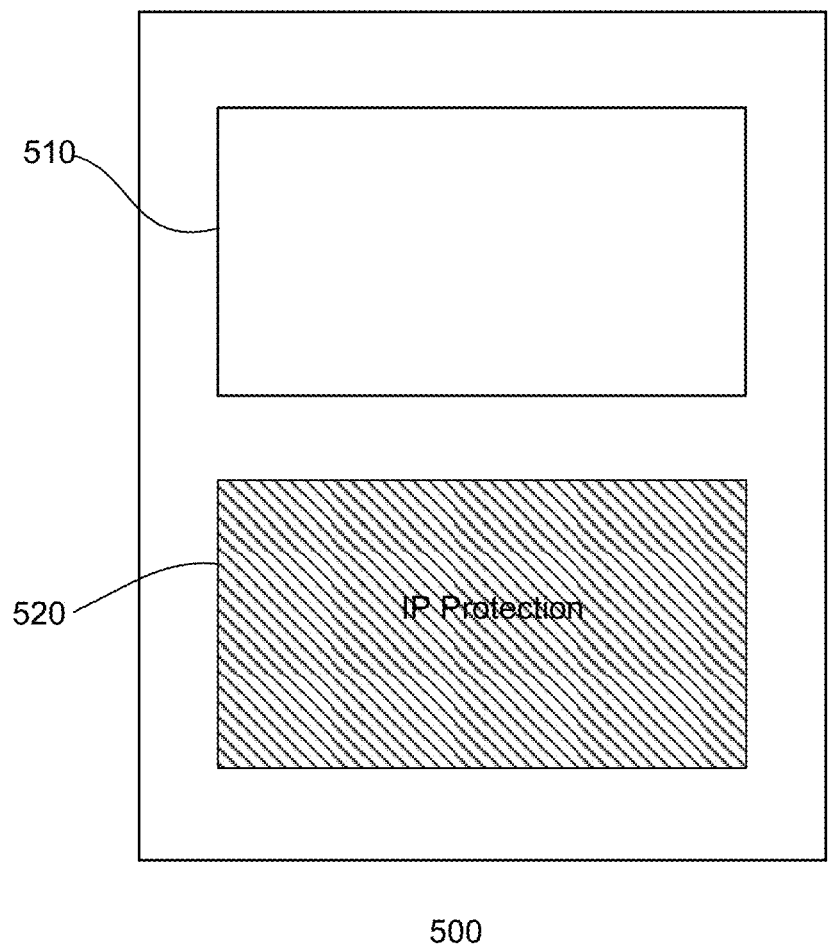
FIGS. 5a-b show MPW masks implemented with IP protection.
Figure 5B:
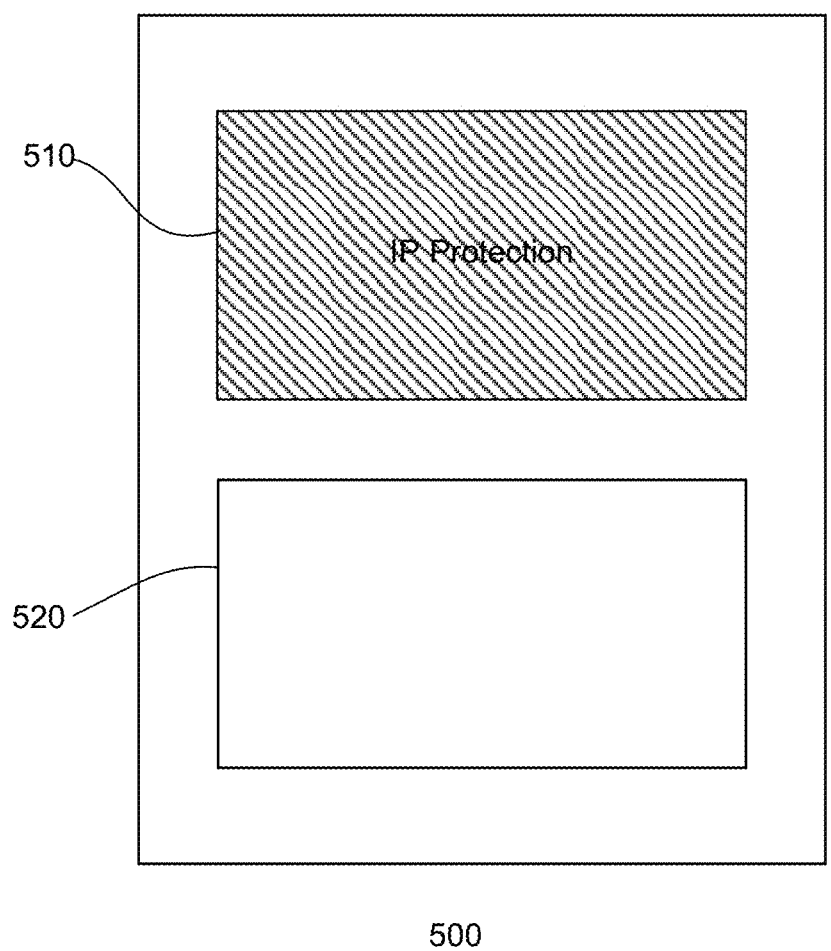

FIGS. 5a-b show devices 500 formed with a MPW mask set. The devices include first and second chiplets 510 and 520 for first and second first parties or IP owners. For example, the first chiplet 510 is designed by the first IP owner and the second chiplet 520 is designed by the second IP owner. In such case, the first chiplet is not relevant to the second IP owner and the second chiplet is not relevant to the first IP owner. Referring to FIG. 5a, the device includes the first chiplet 510 with no IP protection and the second chiplet 520 with IP protection. Wafers containing a plurality of such devices are sent to the first IP owner. On the other hand, wafers with devices such as that shown in FIG. 5b in which the first chiplet 510 with IP protection and the second chiplet without IP protection are sent to the second IP owner.

In one embodiment, one or more masks of a MPW mask set are selected for implementing IP protection. The MPW mask set includes Y number of masks used for different levels of the device. Typically, Y is about 40 to 60 to form a device. Other values for Y may also be useful, depending on the types of devices formed or processes. The last mask used in forming the device is equal to Y while the first mask used is equal to 1. In some cases, some masks may be reused for different processes. The number of masks selected for implementing IP protection for non-relevant chiplets is M, where M is ≥1 and less than Y.

When a $n^{th}$ mask of a MPW mask set is selected for IP protection, where n is a whole number from 1 to Y, the $n^{th}$ mask has a different version for different chiplets in the device of the MPW mask set. Preferably, the $n^{th}$ mask has a different version for different IP owners of the chiplets in the device. For example, in the case of two different IP owners having chiplets in the device of the MPW mask set, two different $n^{th}$ mask are provided. In the event that an IP owner has more than one chiplet in the device, it may not be necessary to provide different masks for the chiplets owned by a common IP owner.

As the value of M increases, more masks are needed to form the devices for the different chiplets of IP owners. The number M, in one embodiment, should be a relatively low number to minimize the number of additional masks needed to implement IP protection. In one embodiment, M is from about 1-3. Providing other values of M may also be useful, depending on, for example, protection and process application requirements.

In one embodiment, the mask or masks selected for IP protection is related to the final processing steps of forming the device. In one embodiment, the $n^{th}$ mask selected to implement IP protection is related to the final processing steps, where n=Y to Y−2. For example, the mask selected can be any one of the masks related to the final three masks used in processing the device. In other embodiments, some or all of the final three masks used in processing the device may be selected for implementing IP protection. In yet other embodiments, more masks or masks at other stages of processing may be selected for IP protection or a combination thereof.

Regarding masks used in the final stages of a process, there may be masks employed in forming the pad via, pad, and passivation levels. For example, such masks may include the VV, LB, and PV masks. As for the PV mask, it may be related to the DV or LV level, depending on the application. The PV mask or reticle, for example, may be $R_Y$, LB may be $R_{Y-1}$ and VV may be $R_{Y-2}$. In one embodiment, VV, LB, PV or a combination thereof are selected for IP protection. Selecting other reticles for IP protection in addition to or in lieu of VV, LB, PV may also be useful.

In one embodiment, chiplets on a device which are not related to a party are IP protected to prevent disclosure of IP to non-relevant parties. The use of IP protection ensures that only the IP owner or a relevant party may access the IP of the chiplet. IP protection may include modifying the chiplets of non-relevant parties. For example, non-relevant chiplets are modified to obscure their IP.

In one embodiment, the mask selected for IP protection has chiplets of non-relevant IP providers implemented with IP protection. For example, mask data of non-relevant chiplets are manipulated to obscure the actual design of the IP owners. Manipulation of mask data may be achieved by additive or subtractive procedure or a combination thereof.

In an additive procedure, data may be added to the original mask data which is designed by the IP owner; in a subtractive procedure, data may be removed from the original mask data which is designed by the IP owner. In the case of a combination of procedures, multiple procedures are employed. For example, data may be removed and additional data may be incorporated to provide modified data which is different from the original mask data designed by the IP owner. In other embodiments, multiple procedures may include any number of procedures ≥2. The multiple procedures may include any number of additive or subtractive procedures or a combination thereof.

Figure 6A:
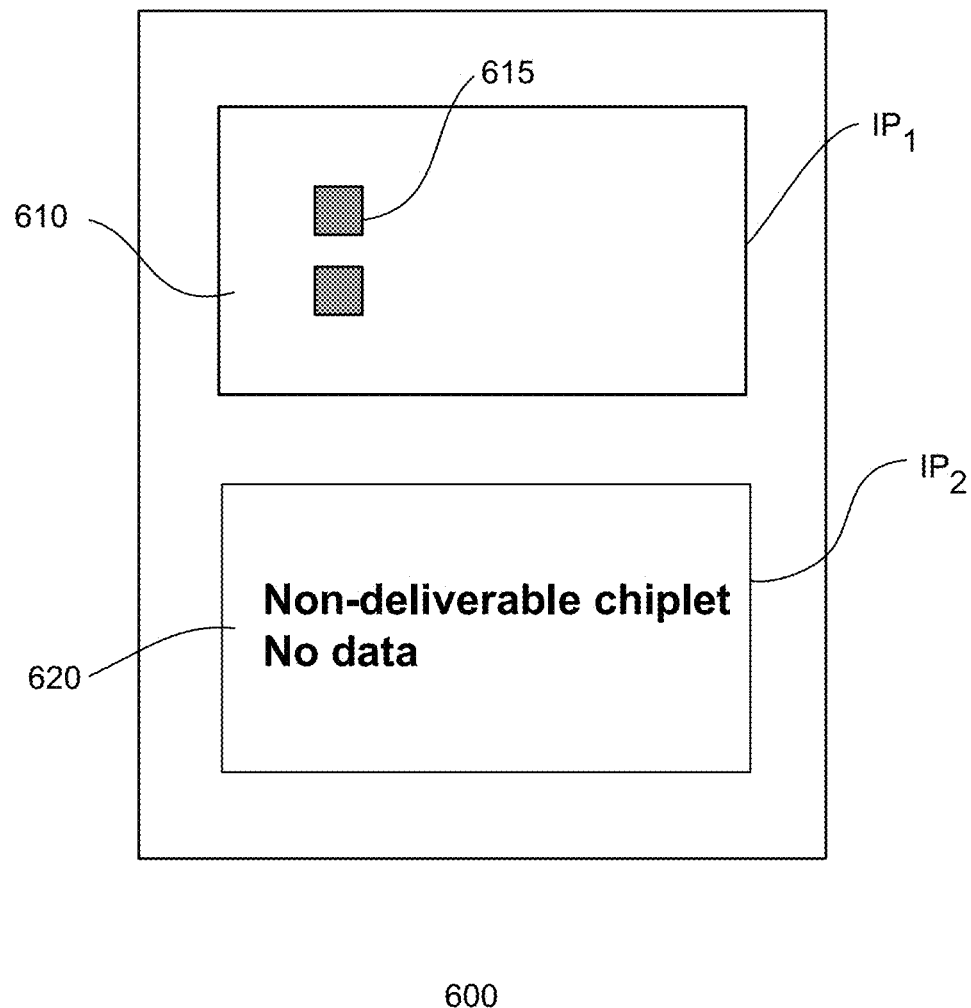
FIGS. 6a-b show an embodiment of a MPW mask with IP protection.
Figure 6B:
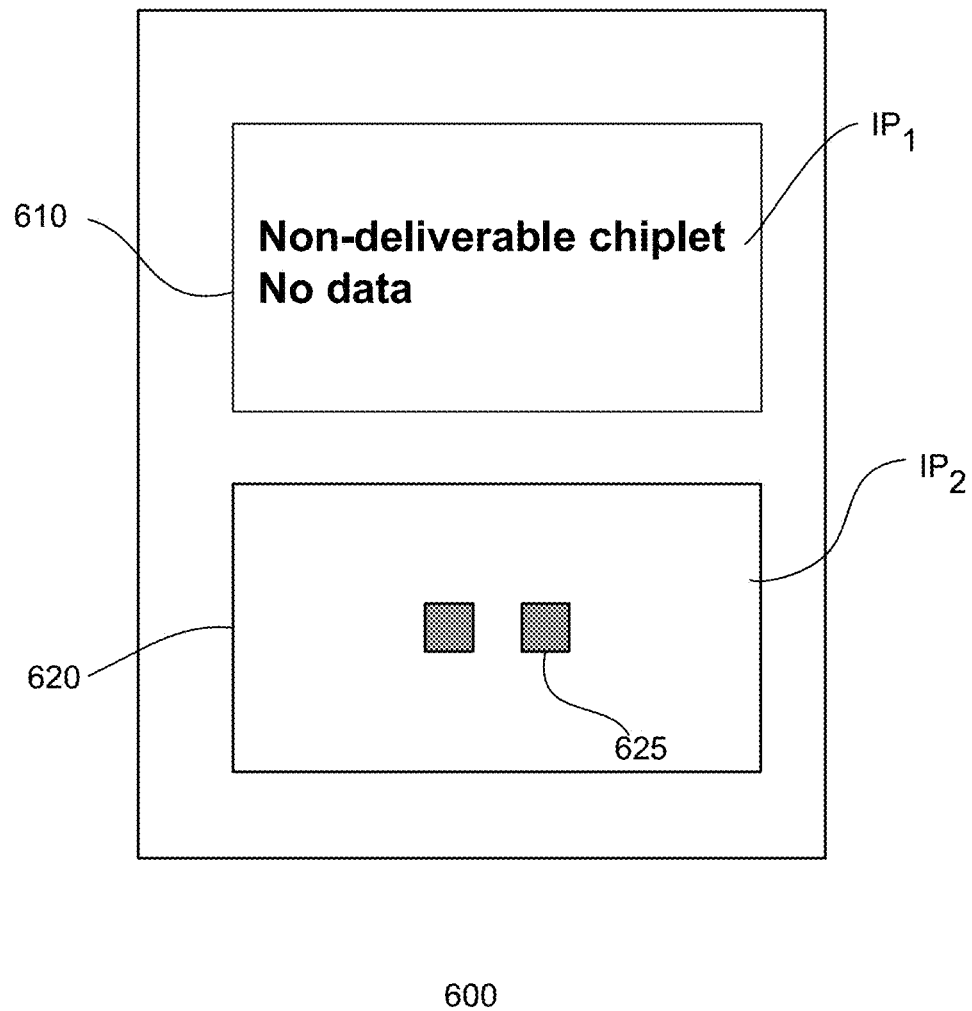

FIGS. 6*a-b* show embodiments of VV masks of a MPW set. As shown, the masks of the MPW set contain two chiplets 610 and 620 of two IP providers $IP_1$ and $IP_2$. It is understood that the MPW mask set may contain more than 2 chiplets from more than two IP providers.

Referring to FIG. 6*a*, the VV mask includes a via pattern 615 for the first chiplet. The via pattern is used to form vias in a substrate or wafer which correspond to contacts in the VV level. The via pattern is designed by $IP_1$. However, the second chiplet is modified to include IP protection. In one embodiment, the second chiplet includes no via pattern or no via data. For example, using this mask results in a blanket dielectric layer without any via openings in the VV level of the second chiplet. Other types of modifications of the VV level may also be employed to implement IP protection of the second chiplet. This VV mask is used to form wafers which are delivered to $IP_1$. By implementing IP protection on the second chiplet, IP of $IP_2$ will be protected from disclosure to $IP_1$.

In FIG. 6*b*, the VV mask is similar to that described in FIG. 6*a* except that the first chiplet is implemented with IP protection while the second chiplet is provided with the via pattern as designed by $IP_2$. The VV mask of FIG. 6*b* is used to form wafers which are delivered to $IP_2$. By implementing IP protection on the first chiplet, IP of $IP_1$ will be protected from disclosure to $IP_2$.

Figure 7A:
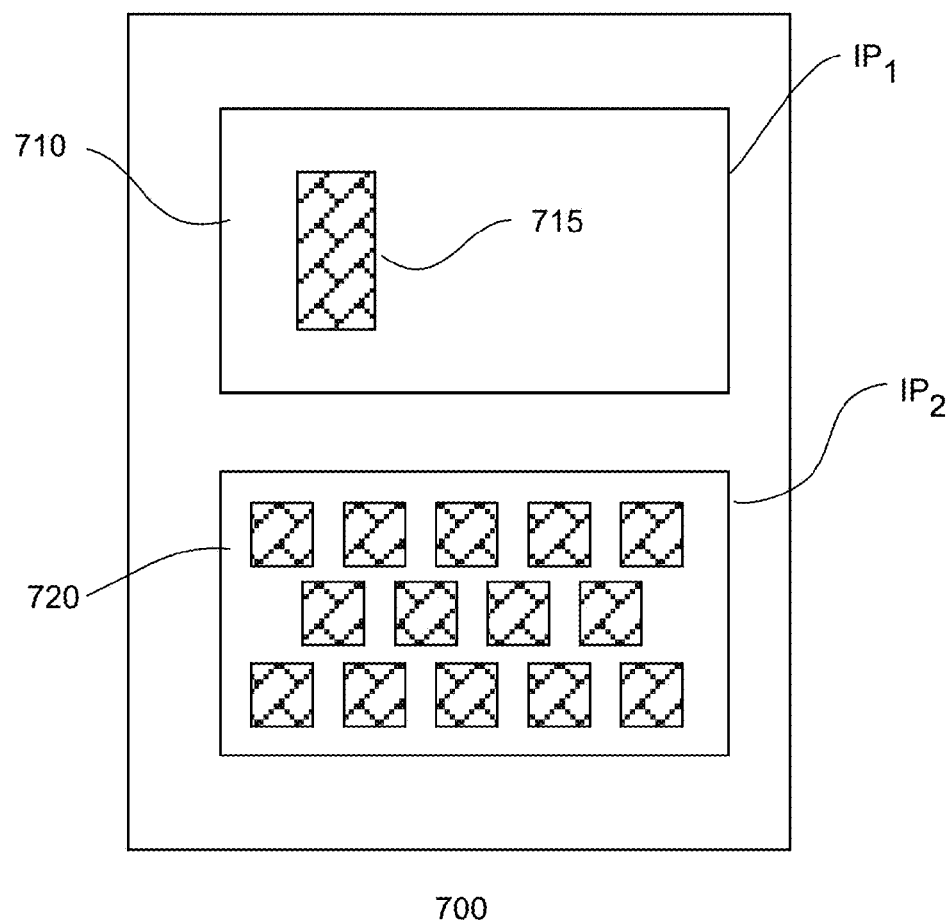
FIGS. 7a-b show another embodiment of a MPW mask with IP protection.
Figure 7B:
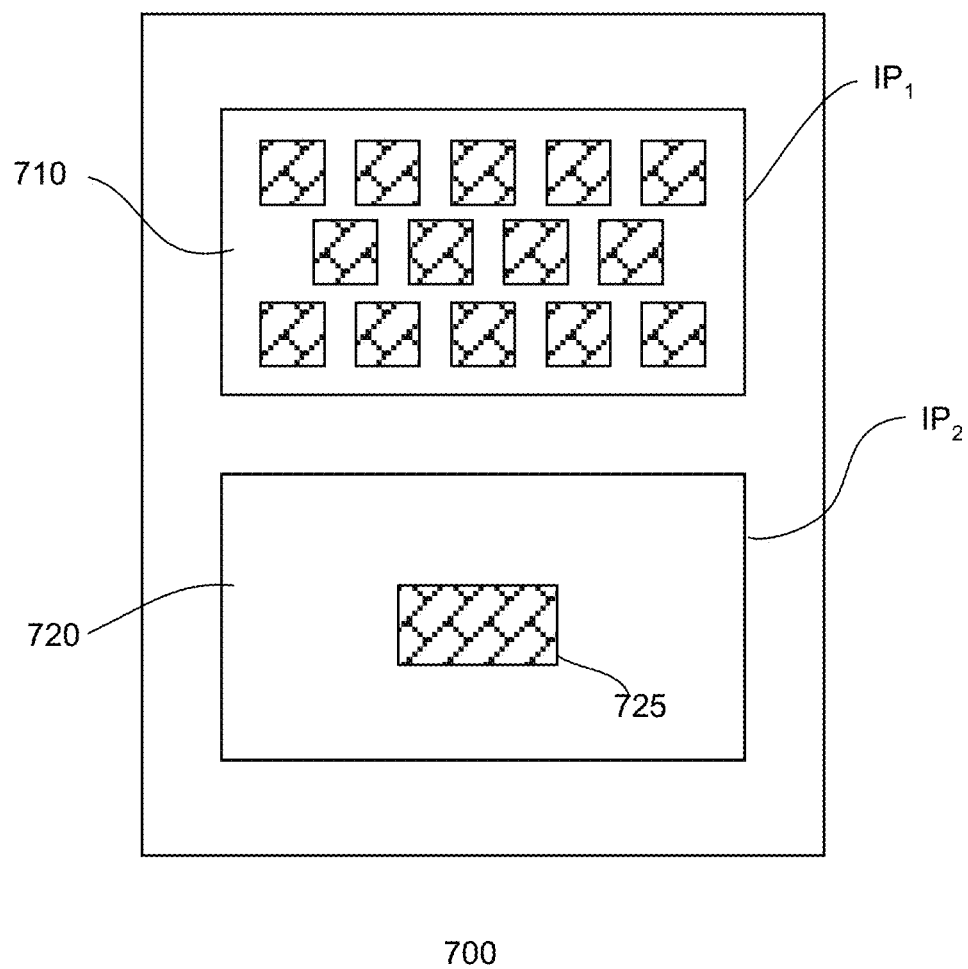

FIGS. 7*a-b* show embodiments of LB masks of a MPW set. As shown, the masks of the MPW set contain two chiplets 710 and 720 of two IP providers $IP_1$ and $IP_2$. It is understood that the MPW mask set may contain more than 2 chiplets from more than two IP providers.

Referring to FIG. 7*a*, the LB mask includes a pad pattern 715 for the first chiplet. The pad pattern is used to form pads in a substrate or wafer which correspond to pads in the LB level. The pad pattern is designed by $IP_1$. However, the second chiplet is modified to include IP protection. In one embodiment, the second chiplet includes a dummy via fill pattern. For example, using this mask results in a plurality of dummy via openings in the LB level of the second chiplet. Other types of modifications of the LB level may also be employed to implement IP protection of the second chiplet. This LB mask is used to form wafers which are delivered to $IP_1$. By implementing IP protection on the second chiplet, IP of $IP_2$ will be protected from disclosure to $IP_1$.

In FIG. 7*b*, the LB mask is similar to that described in FIG. 7*a* except that the first chiplet is implemented with IP protection while the second chiplet is provided with the pad pattern as designed by $IP_2$. The LB mask of FIG. 7*b* is used to form wafers which are delivered to $IP_2$. By implementing IP protection on the first chiplet, IP of $IP_1$ will be protected from disclosure to $IP_2$.

Figure 8A:
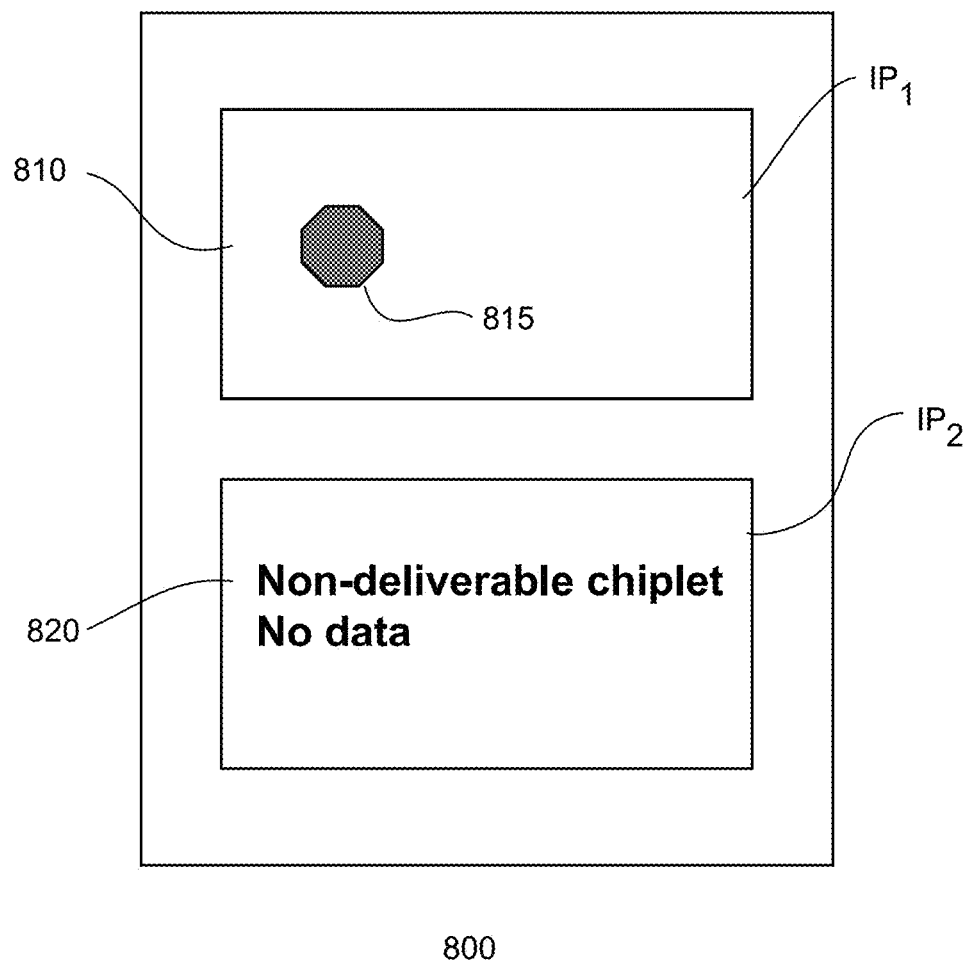
FIGS. 8a-b show yet another embodiment of a MPW mask with IP protection.
Figure 8B:
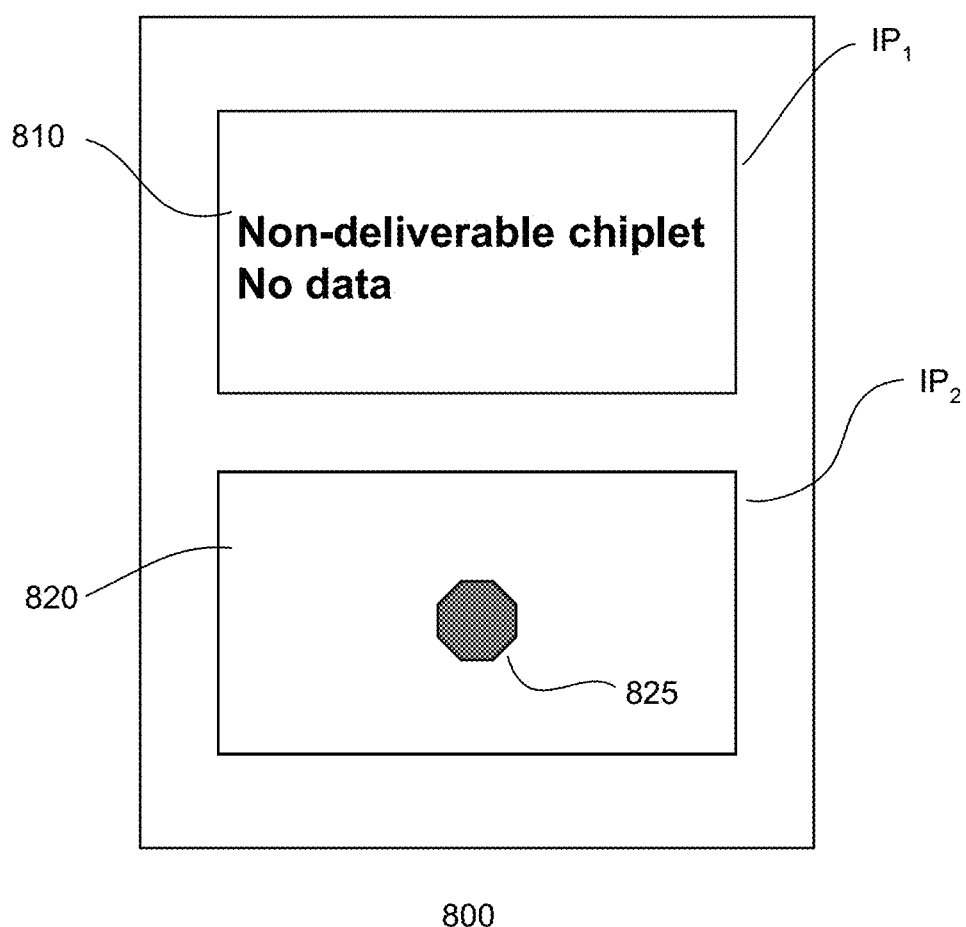

FIGS. 8*a-b* show embodiments of LV masks of a MPW set. As shown, the masks of the MPW set contain two chiplets 810 and 820 of two IP providers $IP_1$ and $IP_2$. It is understood that the MPW mask set may contain more than 2 chiplets from more than two IP providers.

Referring to FIG. 8a, the LV mask includes a pad opening pattern 815 for the first chiplet. The pad opening pattern is used to form openings in the passivation layer to expose the pad thereunder. The pad opening pattern is designed by $IP_1$. However, the second chiplet is modified to include IP protection. In one embodiment, the second chiplet includes no pad opening pattern or no data. For example, the use of this mask forms a blanket passivation layer without any openings in the LV level of the second chiplet. Other types of modifications of the LV level may also be employed to implement IP protection of the second chiplet. The MPW mask set with the LV mask is used to form wafers which are delivered to $IP_1$. By implementing IP protection on the second chiplet. IP of $IP_2$ will be protected from disclosure to $IP_1$.

In FIG. 8b, the LV mask is similar to that described in FIG. 8a except that the first chiplet is implemented with IP protection while the second chiplet is provided with the pad opening pattern as designed by $IP_2$. The MPW mask set with the LV mask of FIG. 8b is used to form wafers which are delivered to $IP_2$. By implementing IP protection on the first chiplet, IP of $IP_1$ will be protected from disclosure to $IP_2$.

As described, FIGS. 6-8 show various additive and subtractive processes applied to different masks of the MPW mask set. It is understood that one or more of any combination of IP protection may be applied to the masks of the MPW mask set. In some embodiments, masks $R_Y$-$R_{Y-2}$ are implemented with IP protection. For example, the VV, LB and LV masks are implemented with IP protection. In other embodiments, at least one of the $R_Y$-$R_{Y-2}$ masks is implemented with IP protection. In yet other embodiments, other mask or masks, in addition or in lieu of $R_Y$-$R_{Y-2}$ masks may be implemented with IP protection.

Figure 9:
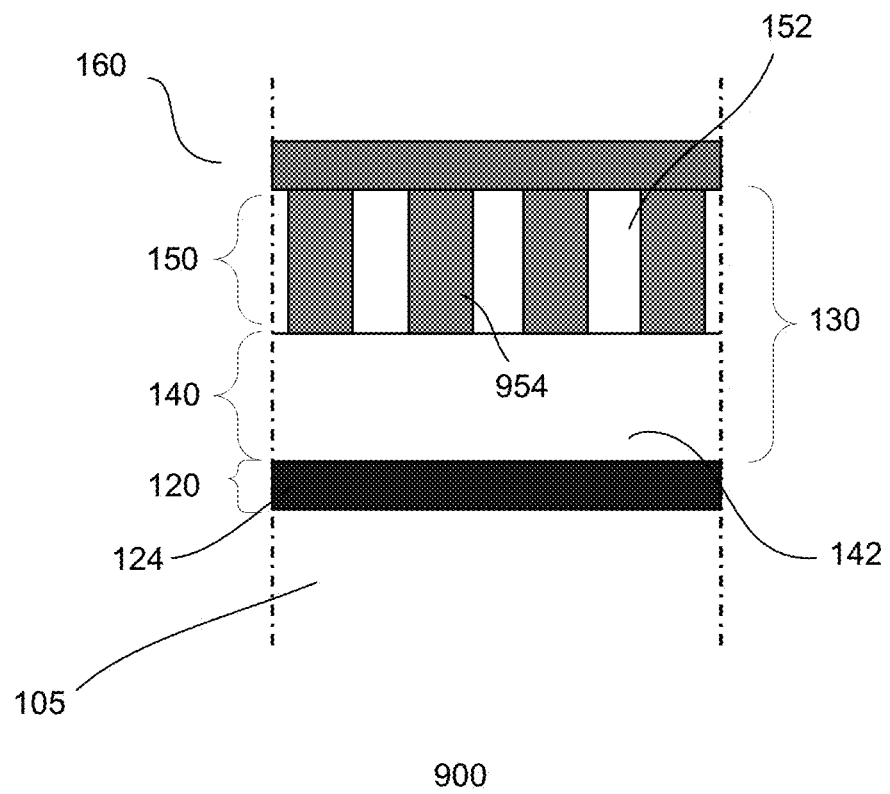
FIG. 9 shows a cross-sectional view of upper levels of an embodiment of a device.

FIG. 9 shows a cross-sectional view of an embodiment of a non-related chiplet 900 implemented with IP protection. As shown, the device includes a pad interconnect level 130. The pad interconnect level includes a pad or LB level 150 disposed above a pad via or VV level 140. Below the pad via level is a last metal interconnect level 120. A passivation layer or PV level 160 is disposed over the pad interconnect level.

In one embodiment, IP protection is implemented in VV, LB and PV levels of the device for non-related chiplets. As shown, the VV level is implemented with a subtractive IP protection procedure. In one embodiment, the subtractive procedure comprises removing mask data, as described in FIGS. 6a-b. The LB process is implemented with subtractive and additive IP protection procedures, as described in FIGS. 7a-b. For example, a dummy via fill pattern 954 may be implemented. As for the PV level, it is implemented with a subtractive IP protection procedure, as described in FIGS. 8a-b. Other reticles or other combination of additive and subtractive IP protection procedures may be implemented for the reticle or reticles.

Figure 10:
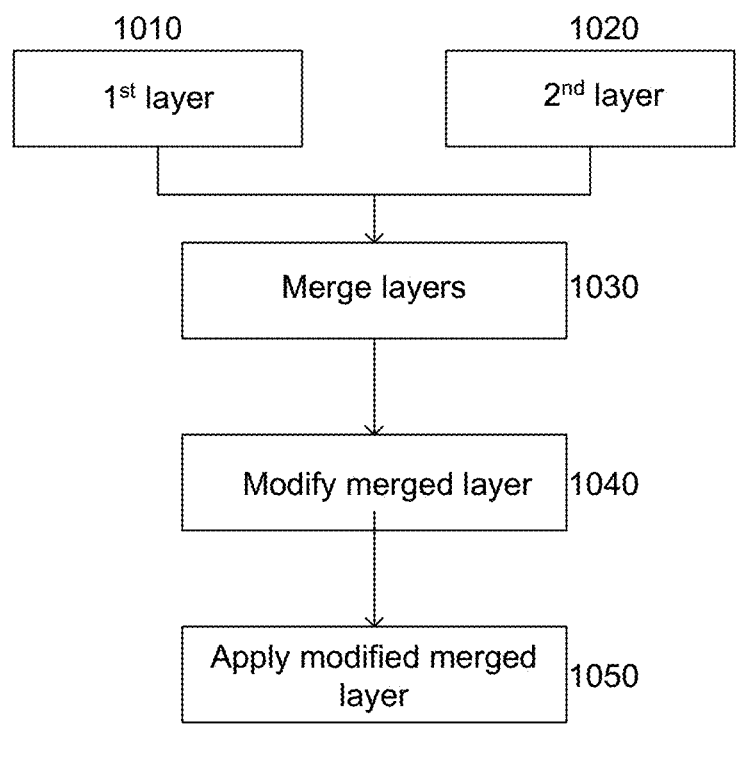
FIG. 10 shows an embodiment of a process flow for implementing IP protection.

FIG. 10 shows another embodiment of an IP protection procedure 1000 for non-relevant chiplets. The IP protection procedure includes a plurality of procedures. For example, first and second mask designs are provided at step 1010 and 1020. The first and second mask designs, in one embodiment, are modified mask designs which correspond to mask levels. For example, the mask levels may be derived from any different metal levels. The mask levels may be from a chiplet or created for the purpose of IP protection. Providing other modified mask designs may also be useful.

In one embodiment, the first mask design includes a plurality of parallel metal line separated by spaces or dummy line patterns in a first or y direction. The metal line patterns may correspond to metal lines in a designated level. The metal lines, for example, comply with the design rules of the designated level. The design rules define, for example, minimum line width and space width, which equals to the minimum pitch. Additionally, there may be a minimum density of the line patterns. In one embodiment, the designated level may be the LB level. Other metal level may also be useful. In some embodiment, the metal lines may be created for the purpose of IP protection.

As for the second mask design, it may include a plurality of modified metal lines. The modified metal lines, for example, may take into consideration the data of the original vias of the VV level. The via design should comply with design rule requirements. The metal lines may be modified based on the information of the underlying vias and extending them to form metal lines in a second or x direction. The second direction, for example, is perpendicular to the first direction of the metal lines of the first mask. In one embodiment, the modified metal lines are extended to at least the width of the space or dummy line patterns of the first mask. Providing other extension amounts may also be useful.

In other embodiment, the second mask design includes metal lines. The metal lines, for example, are arranged in a second or x direction. In one embodiment, the metal lines should at least cover the vias of the VV level. Other configurations of the second mask design may also be useful. For example, the metal lines of the second mask design may be arranged in different directions to cover the vias.

At step 1030, the first and second mask designs are merged to produce a merged mask design. To provide the merged mask design, the first and second mask designs may be overlaid. The merged mask design is further modified to provide a modified merged design at step 1040. In one embodiment, any spacing less than a minimum threshold is removed. For example, the minimum threshold may be less than the space width. Providing other minimum threshold in which spaces are removed may also be useful.

The modified merged mask design is then used to form a mask designated for IP protection at step 1050. In one embodiment, the modified merged mask design is applied to non-relevant chiplets of the LB mask. The modified merged mask design, as shown, shorts the vias in the VV level. Preferably, the modified merged mask design shorts all vias in the VV level. Applying the modified merged mask design to other masks of the MPW mask set may also be useful.

Figure 11B:
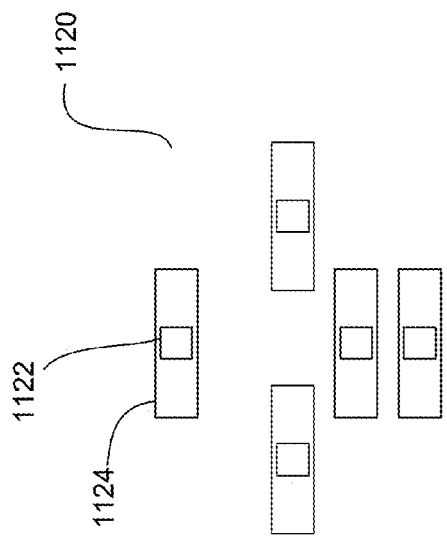
FIGS. 11a-e show an embodiment of IP protection.
Figure 11A:
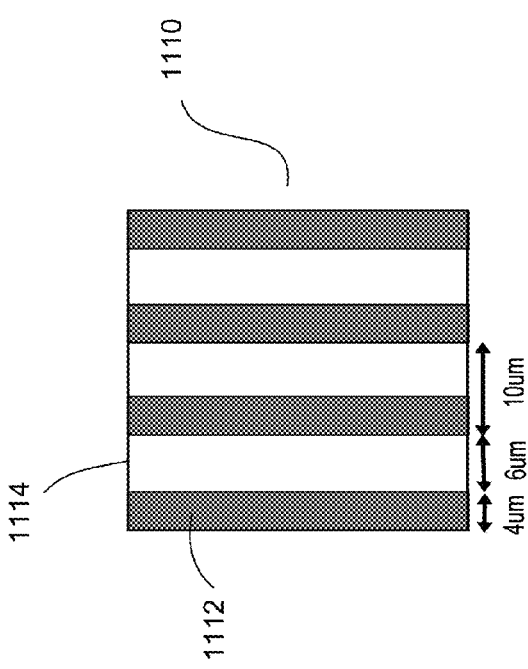

FIGS. 11a-e show an embodiment of a process for implemented IP protection to non-relevant chiplets of a MPW mask. Referring to FIG. 11a, data related to non-relevant chiplets of a first mask 1110 is shown. The first mask includes a plurality of line patterns in a first direction. The line pattern, for example, includes parallel lines 1112 separated by spaces or dummy line patterns 1114 in a first or y direction. The metal line patterns, for example, may correspond to metal lines in a designated mask level. In one embodiment, the metal lines may be for the LB level. Other metal level may also be useful.

The metal lines should comply with the design rules of the level. The design rules define, for example, minimum line width of the lines and minimum space width for the spaces. The line width and space width is equal to the minimum pitch. The line pattern may be equal to the minimum line width while the spacing is greater than the minimum spacing. In addition, there may be a minimum density requirement of the line patterns. For example, the minimum line density may be 30%. An exemplary design rule for the LB level is listed in Table I below.

TABLE I

| | |
|---|---|
| Line width | 4 μm |
| Space width | 2 μm |
| Density | 30% |

As shown, the first mask is provided with a line pattern in which the line width is about 4 μm with a line spacing of about 6 μm. This results in a line pitch of 10 μm. Providing other line widths and spacing widths may also be useful.

FIG. 11b shows a second mask pattern 1120. The second mask pattern, for example, comprises a modified metal line pattern 1124. For example, the modified metal lines may take into consideration the data of the original vias 1122 of a VV level. The pattern of the second mask should comply with the design rules. The width of the modified metal line, for example, may include the size of the via and 0.5 μm/edge in dimension. In one embodiment, the metal lines are modified based on the information of the underlying vias and extending them to form metal lines in a second or x direction. The second direction, for example, is perpendicular to the first direction of the metal lines of the first mask. In one embodiment, the modified metal lines are extended to at least the width of spacing or dummy line patterns of the first mask. Providing other extension amounts may also be useful.

In other embodiment, the second mask design includes metal lines. The metal lines, for example, are arranged in a second or x direction. In one embodiment, the metal lines should at least cover the vias of the VV level. Other configurations of the second mask design may also be useful. For example, the metal lines of the second mask design may be arranged in different directions to cover the vias.

Figure 11C:
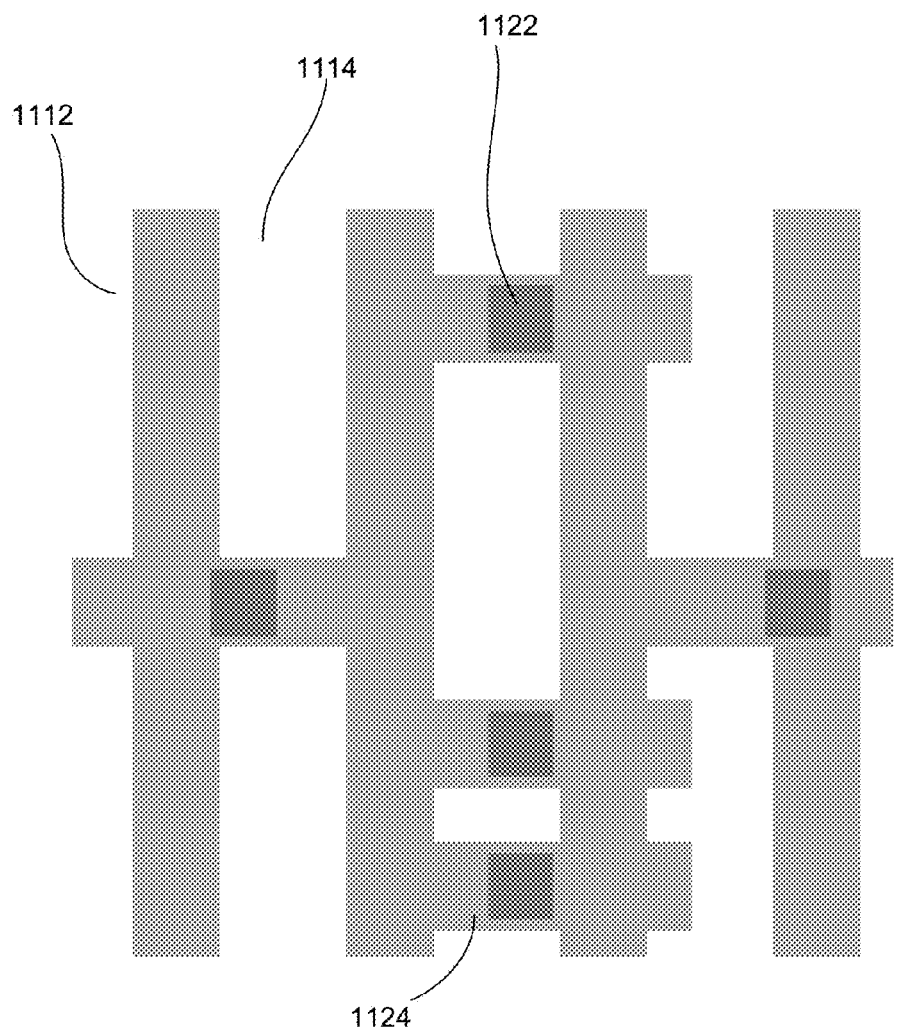

FIG. 11c shows the pattern resulting from the merging of the first and second mask data of FIGS. 11a-b. When the masks, for example, the LB masks, are merged, at least the vias 1122 of the VV level are covered by the merged metal lines to avoid defect generation, such as etch punch through.

Figure 11D:
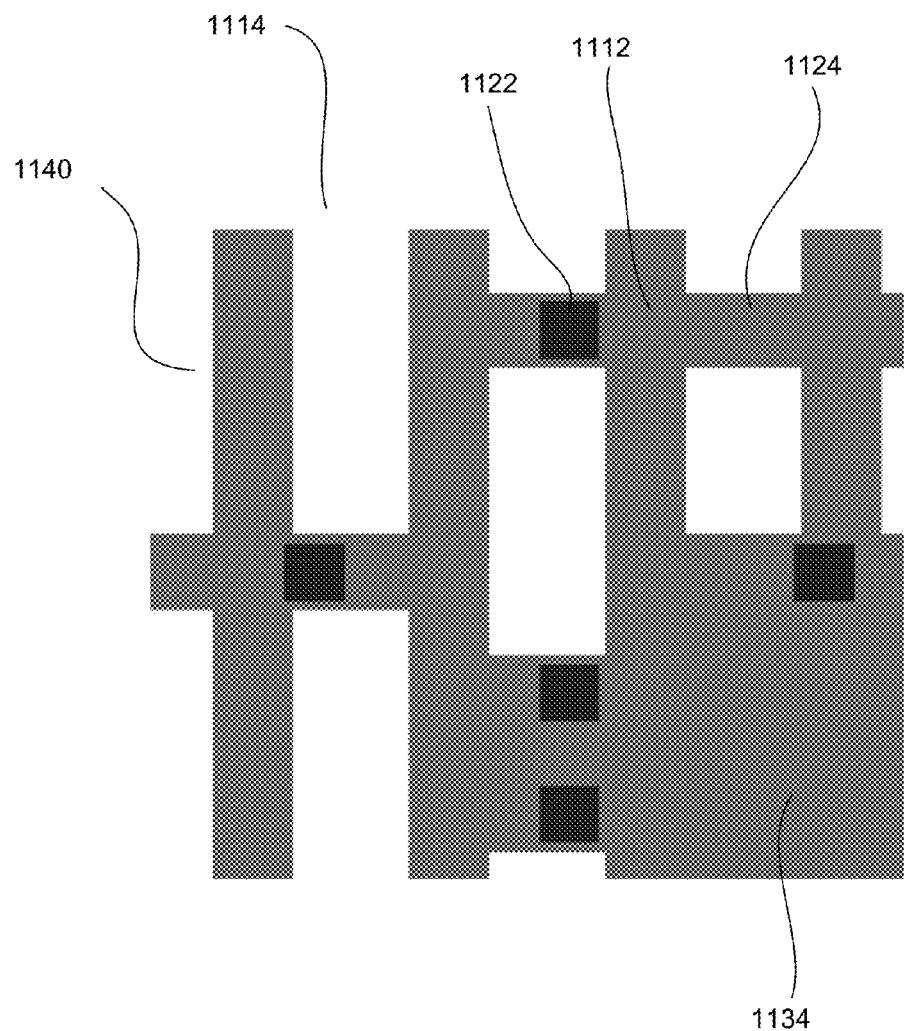

The merged data of the first and second masks is further modified, as shown in FIG. 11d to produce a modified merged mask 1140. In one embodiment, the merged data is modified by removing spaces 1134 which are less than a threshold value. In one embodiment, the threshold value, for example, may be equal to the minimum space width. For example, in the case where the minimum space width is 2 μm, spaces which are less than 2 μm are removed. Providing other minimum threshold value may also be useful.

Figure 11E:
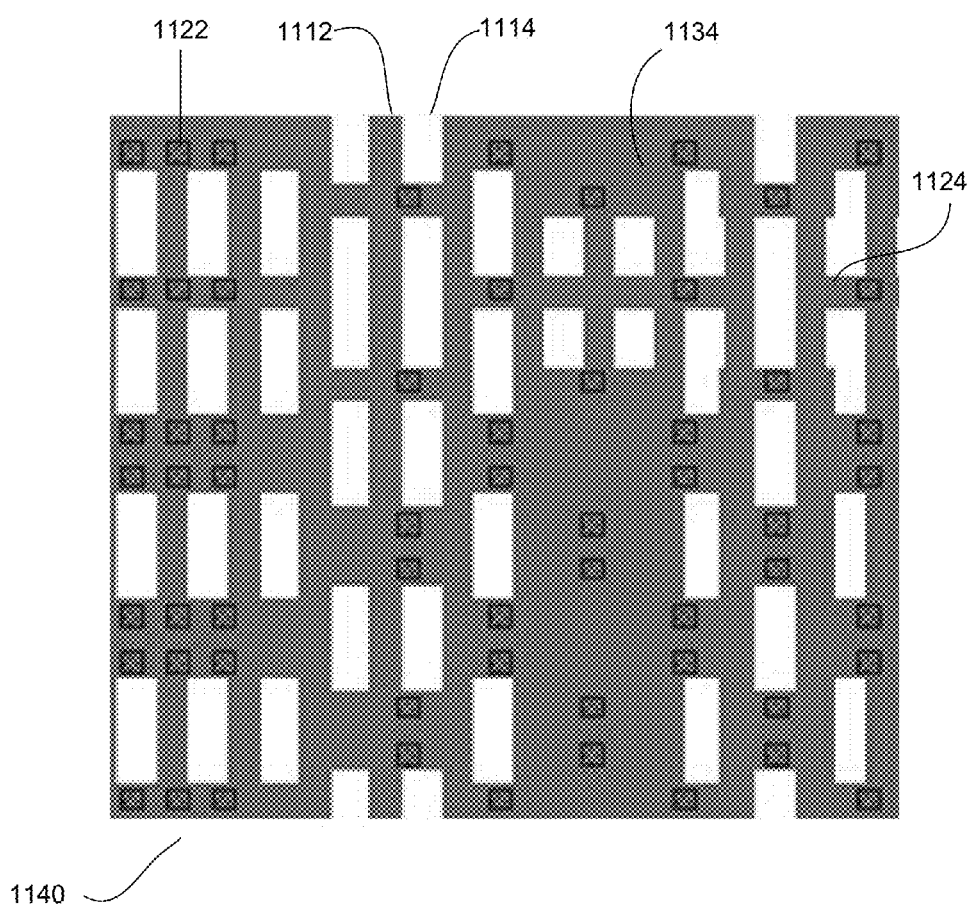

FIG. 11e shows an example of a modified merged mask 1140 under low magnification. As shown, the modified merged mask includes lines 1112 and spaces 1114 merged with modified metal lines 1124. Spaces 1134 which are less than the defined threshold value are removed.

Figure 12:
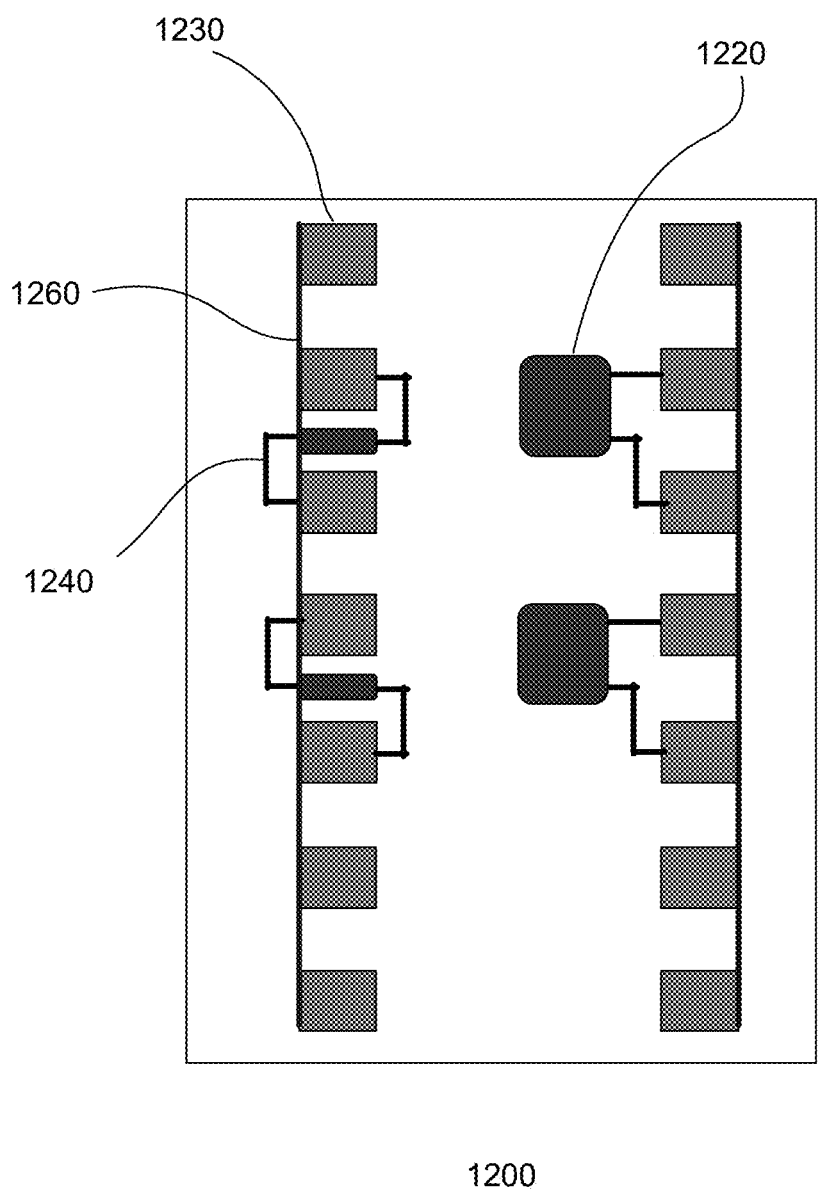
FIG. 12 shows another embodiment of IP protection.

FIG. 12 shows another embodiment of a non-relevant chiplet 1200 implemented with IP protection. As shown, the chiplet includes test pads or probe pads 1230. The test pads are used for testing or characterizing the device. The test pads may be provided at all metal levels. For example, different pads may be provided to test components or circuits 1220 of the chiplet. The pads may include conductive lines 1240 which couple the pads to the component to be tested. This allows probing and test on the pads.

In one embodiment, the test pads are shorted by a conductive line 1260. For example, all the test pads are electrically coupled by the conductive line 1260. The conductive line, for example, includes metal such as copper, aluminium, etc. Providing a conductive line with other types of materials may also be useful.

In some embodiments, some of the test pads are shorted or electrically coupled. Shorting test pads prevents characterizing the chiplet by non-IP owners. In one embodiment, test pad conductors are provided to electrically couple a plurality of test pads to render the test pads inoperable.

As described, IP protection may be used to protect IP of an IP provider, for example, in the context of MPW. The IP protection may be provided at different mask levels. The various IP protections described may be employed individually or in any combination. Additionally, the IP protection may be employed at any mask level, including multiple mask levels.

Figure 13:
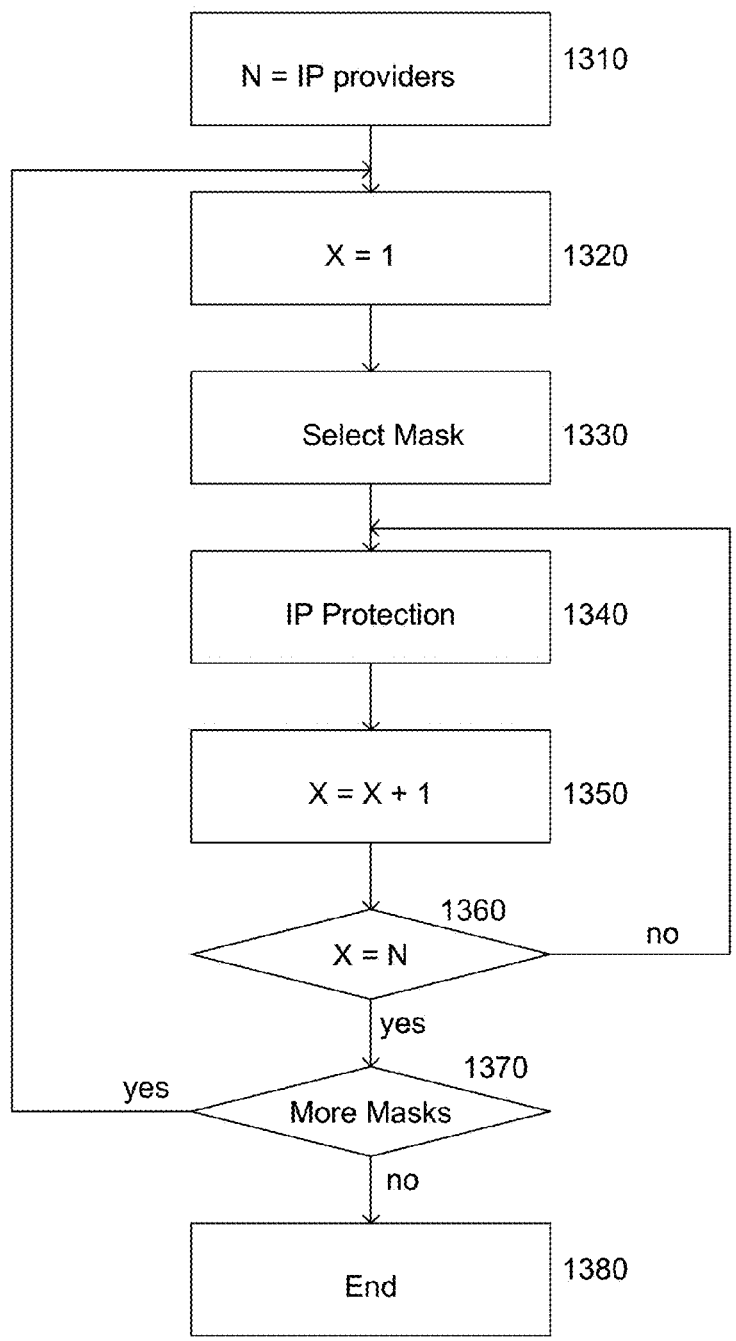
FIG. 13 shows a process flow of implementing IP protection.

FIG. 13 shows a process flow 1300 of implementing IP protection for non-relevant chiplets on mask or masks of a MPW mask set. In one embodiment, it is determined that the MPW mask includes N number of IP providers at step 1310. The process is initialized. For example, X is initialized to a value of 1 at step 1320. At step 1330, a mask is selected for implementing IP protection. The selected mask is processed. For example, data of non-relevant chiplets in the selected mask is manipulated to implement IP protection at step 1340. At step 1350, X is incremented by 1.

At step 1360, it is determined whether the IP implementation for the selected mask has been completed. For example, it determines whether X is equal to the number of IP providers (X=N). In the event where X is not equal to N, the process returns to step 1340. Additional processing is performed to provide IP protection for other IP providers. For example, if there are two IP providers on the MPW mask, two iterations of IP protection is performed to provide two versions of the selected mask. One version protects the IP of the first IP provider and the other to protect the IP of the second IP provider. On the other hand, if X is equal to N, processing for IP protection is completed for the selected mask.

The process continues to step 1370 to determine if there is another mask which is selected for IP protection. If there is another mask selected for IP protection, the process returns to step 1320. On the other hand, if no other mask is selected for IP protection, IP protection implementation is completed at step 1380.

Figure 14A:
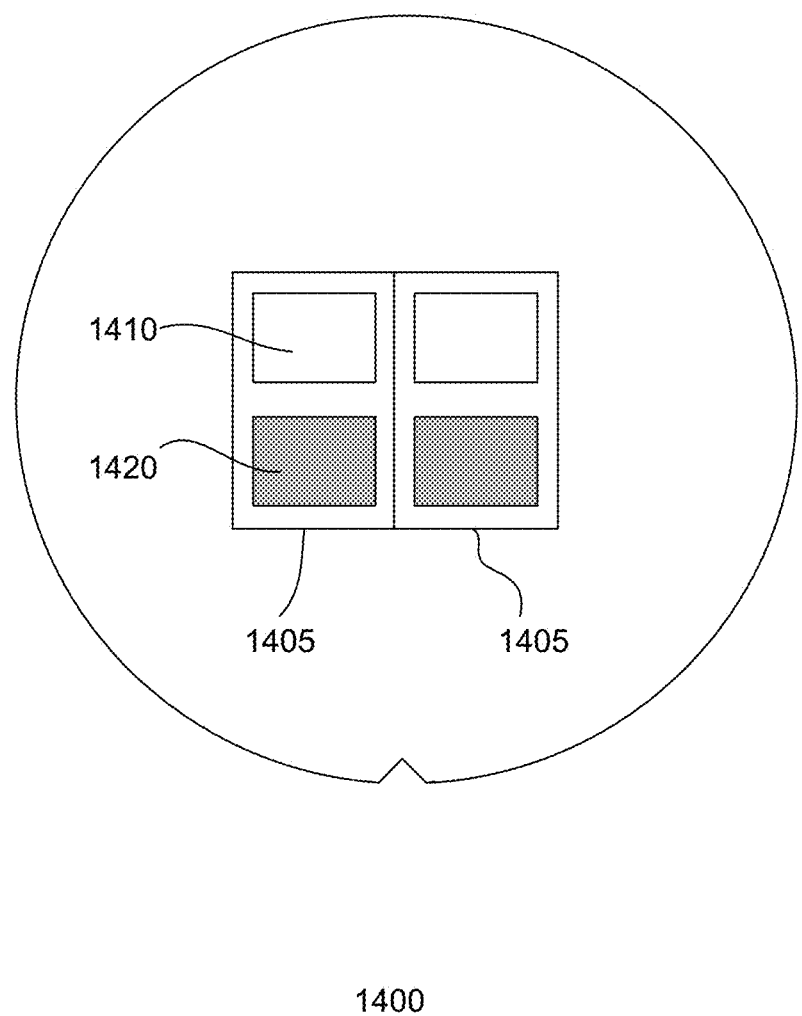
FIGS. 14a-b show wafers delivered to different IP owners.
Figure 14B:
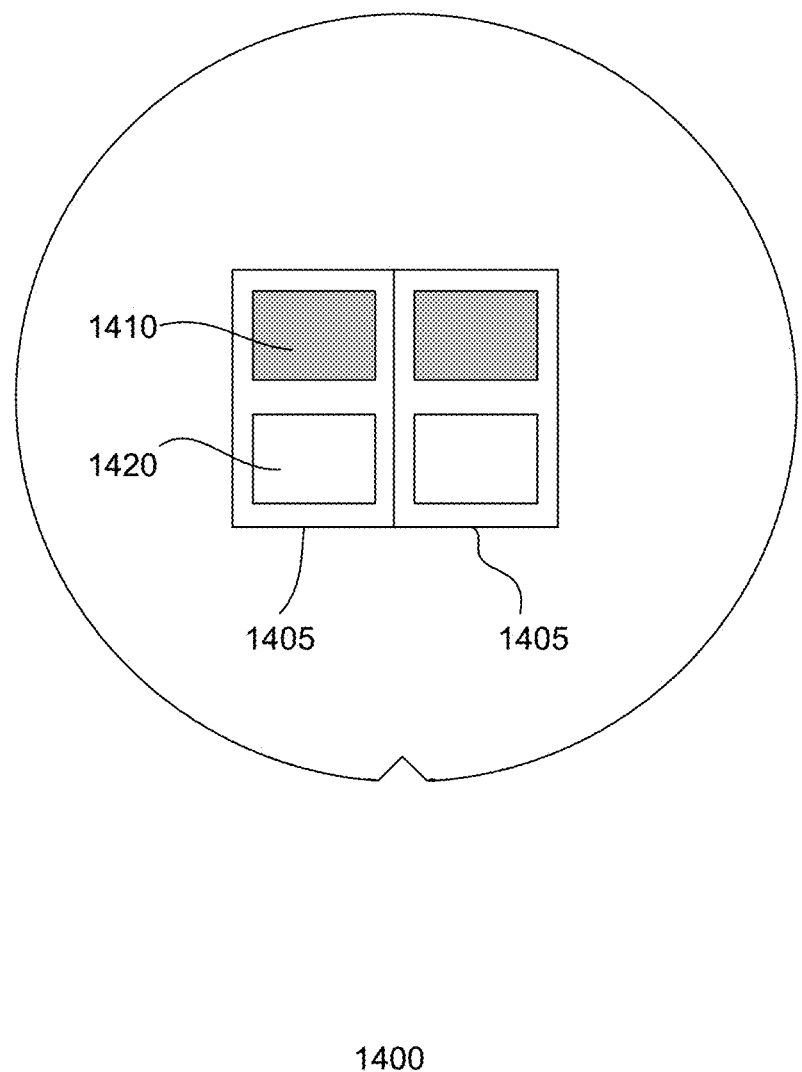

FIGS. 14a-b show wafers 1400 which have been processed by masks implemented with IP protection. As shown, the wafers include devices 1405 formed by MPW masks having first and second chiplets 1410 and 1420 of first and second IP providers. For simplification, the wafer is shown with two devices. It is understood that the wafer may include other number of devices as well as the devices including other number of chiplets.

In FIG. 14a, the second chiplet is implemented with IP protection, as indicated by the shaded chiplet, while the first chiplet includes real data of the first IP owner. This processed wafer is delivered to the first IP owner for testing and evaluation. However, the IP of the second IP provider is protected from disclosure to the first IP provider due to IP protection. As for the wafer of FIG. 14b, the first chiplet is implemented with IP protection while the second chiplet includes real data of the second IP owner. This processed wafer is delivered to the second IP owner for testing and evaluation. However, the IP of the first IP provider is protected from disclosure to the first IP provider due to IP protection.

The MPW mask or reticle developed can be used to form semiconductor devices or integrated circuits (ICs). For example, the reticle can be used to pattern a substrate to form the features which serve as components on the substrate. The components are interconnected to form devices or ICs with the desired function. The substrate, for example, can be a wafer in which a plurality of devices or ICs are formed. After processing of the wafer is completed, the devices are diced, separating the wafer into individual dies. Continued processing can be performed, such as assembly, testing and packaging to complete forming the devices or ICs.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A device comprising:
    a substrate comprising first and second chiplet regions;
    a first chiplet in the first chiplet region, the first chiplet pertains to a first intellectual property (IP) owner;
    a second chiplet in the second chiplet region, the second chiplet pertains to a second intellectual property (IP) owner; and
    a device layer disposed on the first and second chiplets, the device layer is a common device layer of the first and second chiplets, wherein
        the device layer on the first chiplet contains a first pattern for the first chiplet, the first pattern is consistent with a first mask pattern on an uncovered multi-project wafer (MPW) reticle, the first mask pattern is in accordance with a design of the first IP owner, and
        the device layer on the second chiplet contains a second pattern for the second chiplet, the second pattern is consistent with a second mask pattern on the uncovered MPW reticle, the second mask pattern on the uncovered MPW reticle comprises a second modified mask pattern which is different from a design of the second IP owner, wherein
            the first chiplet is an operable chiplet, and
            the second chiplet is an inoperable chiplet due to the second modified mask pattern on the uncovered MTW.

2. The device of claim 1 wherein the device is a prototype device used to define a final product.

3. The device of claim 1 wherein the device layer is a final interconnect level of the device.

4. The device of claim 1 wherein the second pattern of the second chiplet includes modified device level data of the second chiplet.

5. The device of claim 4 wherein the modified device level data includes design rules of an original device level data designed by the second IP owner.

6. The device of claim 4 wherein the second pattern of the second chiplet includes modified device level data of a via pad level, a pad level, a passivation layer level or a combination thereof.

7. The device of claim 6 wherein the modified device level data of the via pad level includes no via pattern or no via data.

8. The device of claim 6 wherein the modified device level data of the pad level includes a plurality of dummy via fill pattern.

9. The device of claim 6 wherein the modified device level data of the passivation layer level includes no opening pattern or no data.

10. The device of claim 1 wherein the second pattern includes modified design pattern of a device level of the second chiplet.

11. The device of claim 10 wherein:
    the modified design pattern of the device level includes a modified merged pattern;
    the modified merged pattern includes a merger of first and second modified design patterns, wherein the first modified design pattern includes a plurality of metal lines separated by spaces or dummy lines, and the second modified design pattern is a modified pattern which is different from an original via pattern of a via level.

12. The device of claim 1 wherein the second chiplet includes a plurality of test pads and test components.

13. The device of claim 12 comprising a plurality of test pad conductors to electrically couple the plurality of test pads to render the test pads of the second chiplet inoperable.

14. The device of claim 12 wherein the plurality of test pads are shorted to render the second chiplet inoperable.

15. The device of claim 14 wherein the plurality of test pads are shorted by a conductive line.

16. A device comprising:
    a substrate comprising at least first and second chiplet regions;
    a first chiplet in the first chiplet region, the first chiplet pertains to a first intellectual property (IP) owner;
    a second chiplet in the second chiplet region, the second chiplet pertains to a second intellectual property (IP) owner; and
    a device layer disposed over the first and second chiplet regions, the device layer is a common device layer of the first and second chiplets, wherein
        the device layer over the first chiplet region contains a first pattern for the first chiplet, the first pattern is consistent with a first mask pattern on an uncovered multi-project wafer (MPW) reticle, the first mask pattern is in accordance with a design of the first IP owner, and
        the device layer on the second chiplet region contains a second pattern for the second chiplet, the second pattern is consistent with a second mask pattern on the uncovered MPW reticle, the second mask pattern on the uncovered MPW reticle comprises a second modified mask pattern which is different from a design of the second IP owner, wherein
            the second modified mask pattern comprises design rules in accordance with the design of the second IP owner,
            the first chiplet is an operable chiplet, and
            the second chiplet is an inoperable chiplet due to the second modified mask pattern on the uncovered MPW reticle.

17. The device of claim 16 wherein the second pattern of the second chiplet includes modified device level data of the second chiplet.

18. The device of claim 17 wherein the second pattern of the second chiplet includes modified device level data of a via pad level, a pad level, a passivation layer level or a combination thereof.

19. The device of claim 16 wherein the second pattern includes a modified merged pattern, the modified merged pattern includes a merger of two or more modified design patterns of the second chiplet.

20. A device comprising:
a substrate comprising first and second chiplet regions;
a first chiplet in the first chiplet region, the first chiplet pertains to a first intellectual property (IP) owner;
a second chiplet in the second chiplet region, the second chiplet pertains to a second intellectual property (IP) owner; and
a device layer disposed over the first and second chiplet regions, the device layer is a common device layer of the first and second chiplets, wherein
the device layer over the first chiplet region contains a first pattern for the first chiplet, the first pattern is consistent with a first mask pattern on an uncovered multi-project wafer (MPW) reticle, the first mask pattern is in accordance with a design of the first IP owner,
the device layer over the second chiplet region contains a second pattern for the second chiplet, the second pattern is consistent with a second mask pattern on the uncovered MPW reticle, the second mask pattern comprises a second modified mask pattern which is different from a design of the second IP owner, and
the second mask pattern comprises design rules in accordance with the design of the second IP owner, wherein the second chiplet includes IP protection due to the second modified mask pattern on the uncovered MPW reticle to reduce disclosure of IP information of the second IP owner.

* * * * *